United States Patent [19]

Villa

[11] Patent Number: 5,459,810
[45] Date of Patent: Oct. 17, 1995

[54] ADJUSTABLE PANEL AND MOUNTING ASSEMBLY

[76] Inventor: Philip F. Villa, Outwood, Lark Rise, East Horsley, Surrey KT24 6TN, United Kingdom

[21] Appl. No.: 969,274
[22] PCT Filed: Jul. 19, 1991
[86] PCT No.: PCT/GB91/01215
 § 371 Date: Jan. 15, 1993
 § 102(e) Date: Jan. 15, 1993
[87] PCT Pub. No.: WO92/01847
 PCT Pub. Date: Feb. 6, 1992

[30] Foreign Application Priority Data

Jul. 20, 1990 [GB] United Kingdom ............ 9016002
Dec. 21, 1990 [GB] United Kingdom ............ 9027847

[51] Int. Cl.⁶ .................. E04F 19/04; F16B 5/06; F24H 3/00
[52] U.S. Cl. .................... 392/352; 165/55
[58] Field of Search .................... 392/436, 437, 392/435, 352, 353, 377; 165/53, 55, 56; 174/48, 49; 219/536; 52/782

[56] References Cited

U.S. PATENT DOCUMENTS

| | | | |
|---|---|---|---|
| 2,460,625 | 2/1949 | Ellis | 165/53 |
| 2,855,186 | 10/1958 | Brinen | 165/55 |
| 2,993,978 | 7/1961 | Markel et al. | 165/55 |
| 3,165,624 | 1/1965 | Cunningham | 392/353 |
| 4,149,065 | 4/1979 | Goff et al. | 165/55 |
| 4,677,279 | 6/1987 | Wesseltoft | 165/53 |
| 4,766,951 | 8/1988 | Bergh | 165/56 |
| 5,024,614 | 6/1991 | Dola et al. | 174/48 |

FOREIGN PATENT DOCUMENTS

| | | | |
|---|---|---|---|
| 2564537 | 11/1985 | France. | |
| 504066 | 12/1954 | Italy | 165/53 |
| 57204 | 10/1968 | Luxembourg. | |
| 373826 | 12/1963 | Switzerland. | |
| 418602 | 2/1967 | Switzerland. | |
| 42911 | 7/1967 | Switzerland. | |
| 399681 | 12/1932 | United Kingdom | 165/53 |
| 2128223 | 4/1984 | United Kingdom. | |
| 2248923 | 4/1992 | United Kingdom | 165/55 |

Primary Examiner—John A. Jeffery
Attorney, Agent, or Firm—Fay, Sharpe, Beall, Fagan, Minnich & McKee

[57] ABSTRACT

An adjustable panel mounting system particularly adapted for skirting heating systems includes an extruded aluminum front panel (2) having a pair of inwardly turned flanges (10, 12) on its rear surface and flexible winged mounting adaptors (18) made of resilient material such as nylon. The adaptors fit loosely between the flanges of the front panel so as to allow up and down adjustability of the panel position to allow for uneven floors or to enable access to the space behind the panel, and also to allow the panel to move if adjacent panels expand on heating. The rear surface also carries tubes (14, 16) for heating water or electrical heating elements. The mounting adaptors are fixed to the wall by two part mounting blocks (32, 38) which provide additional adjustability in other directions.

24 Claims, 16 Drawing Sheets

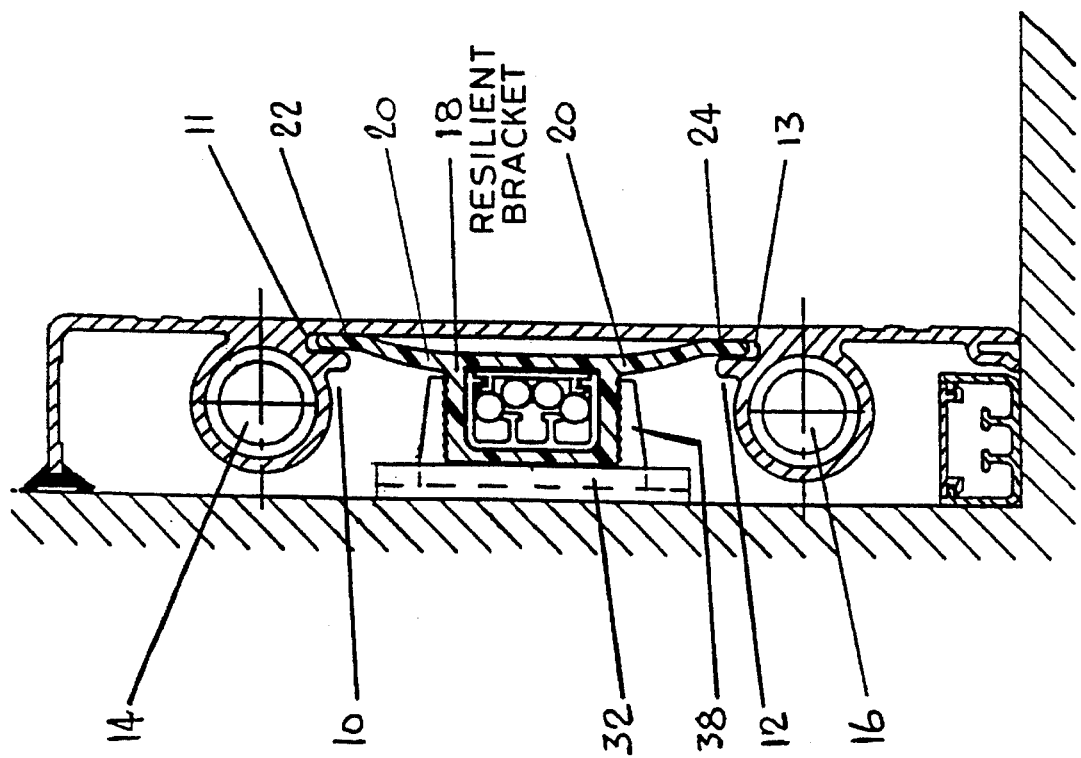
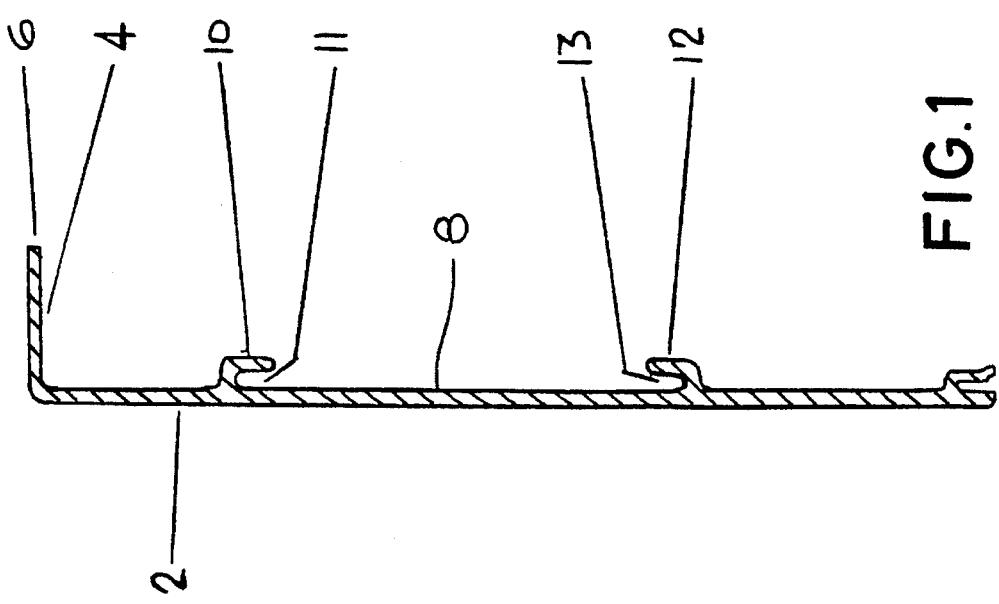

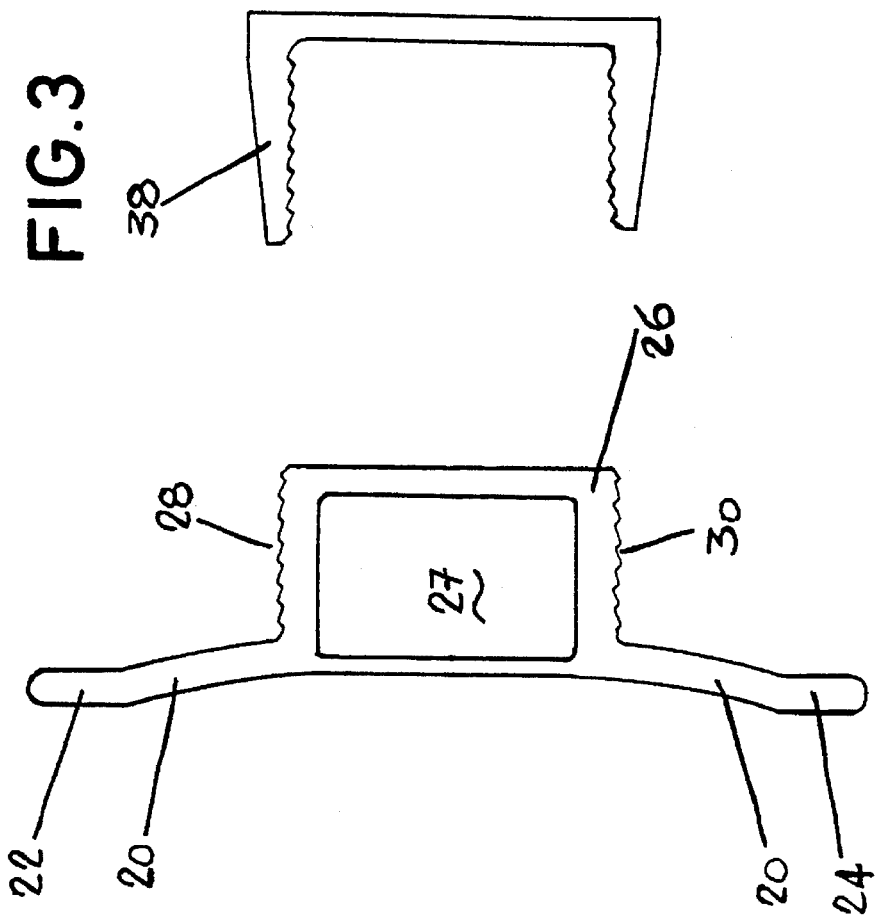
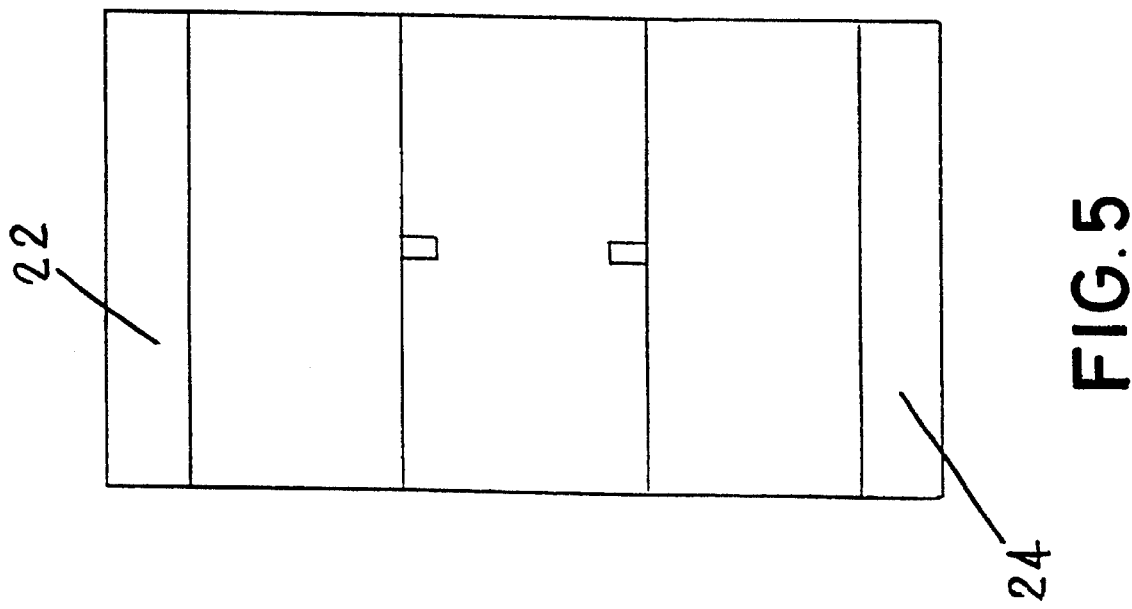

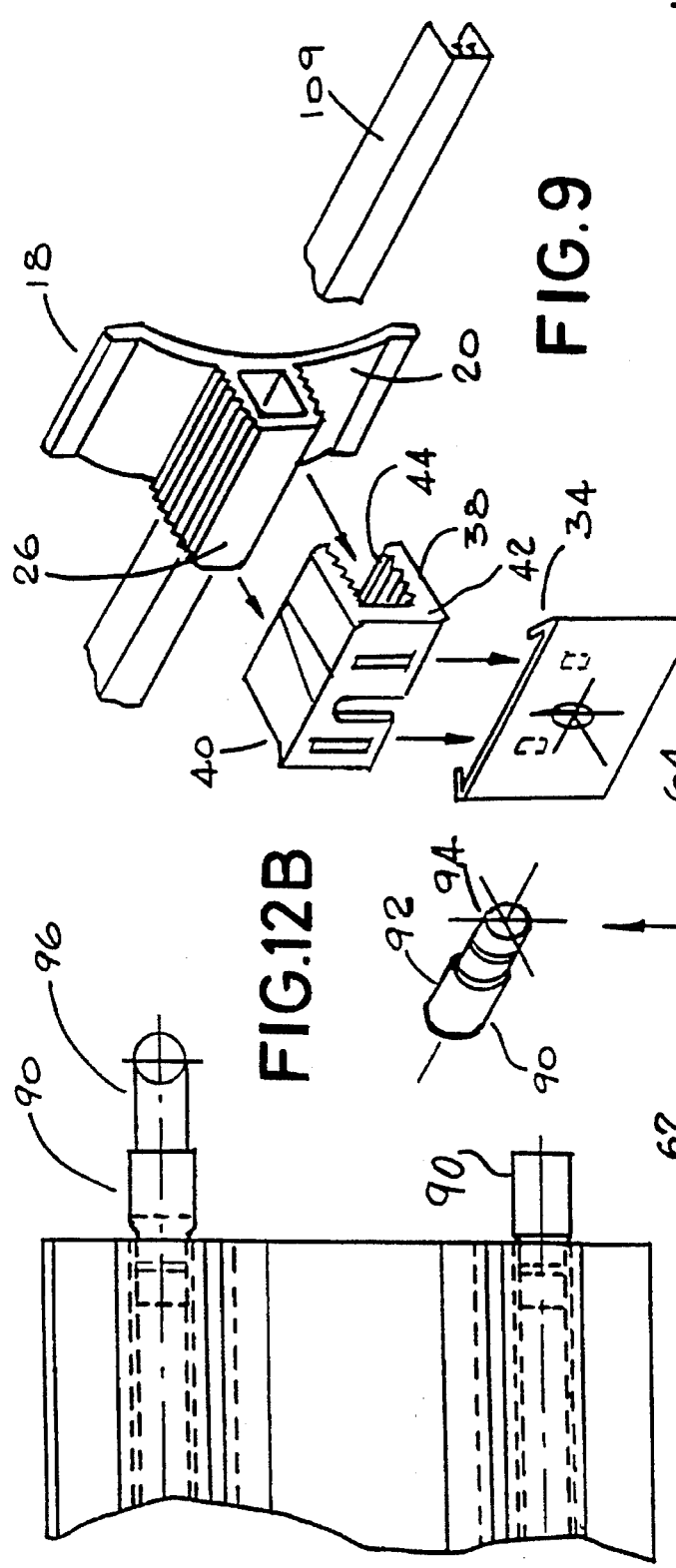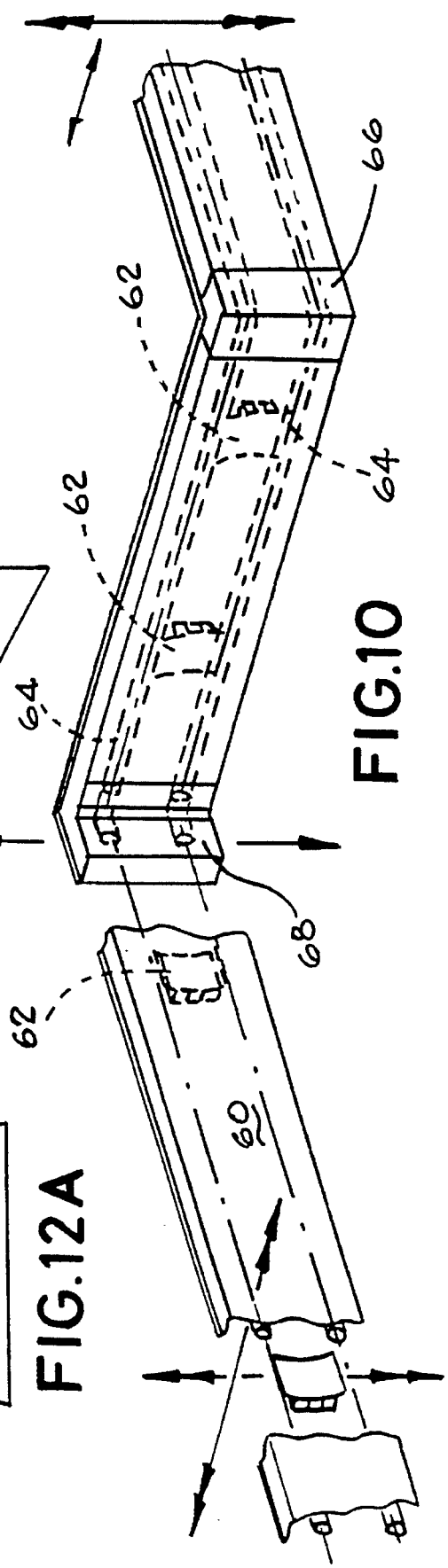

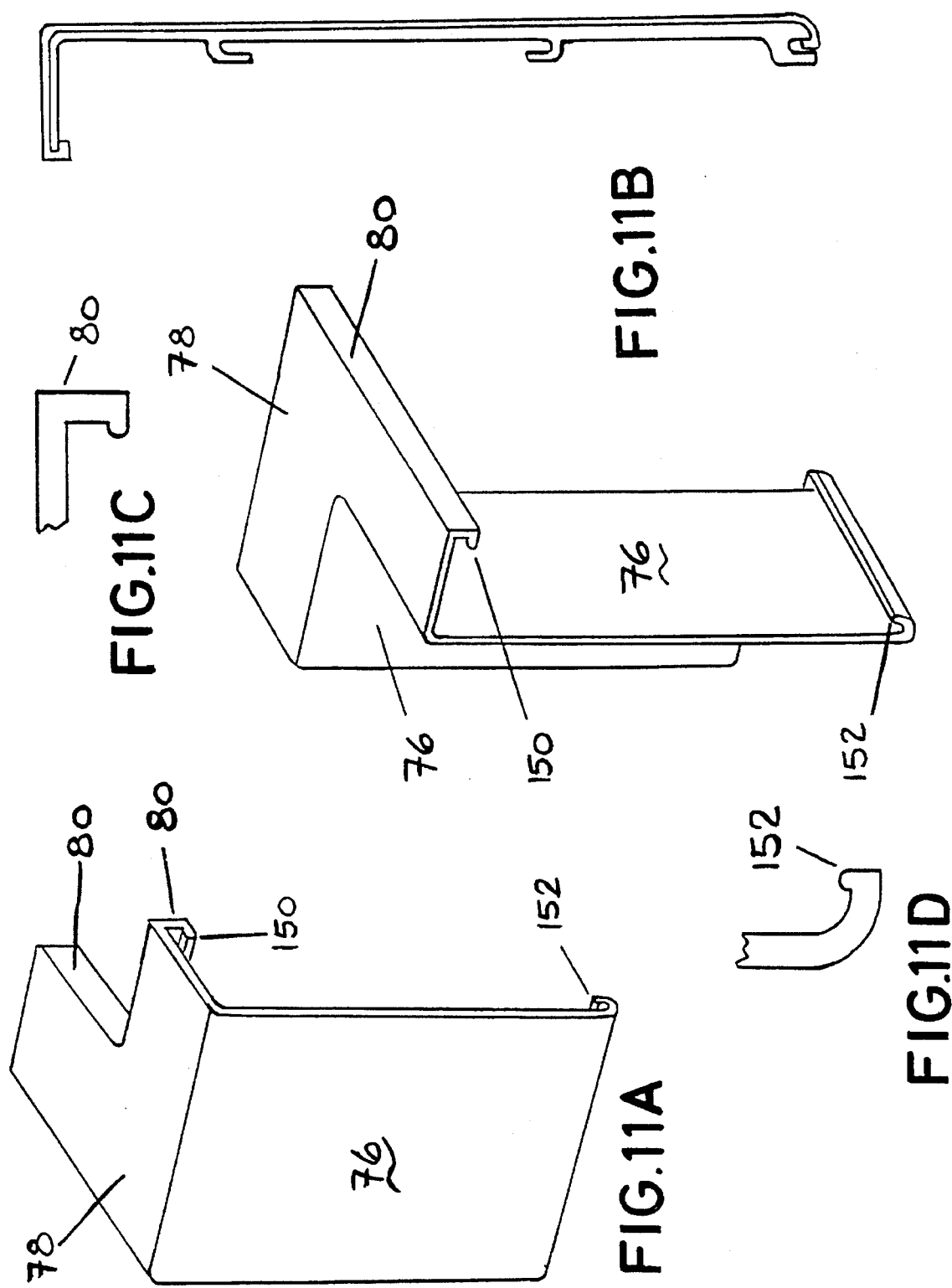

ADJUSTABLE PANEL AND MOUNTING ASSEMBLY

This invention relates to an adjustable panel and mounting assembly particularly, although not exclusively, for use in a cooling or heating system in which heat exchange panels are mounted on a surface such as a wall or a ceiling.

In a preferred application, the invention relates to a heating system of the "modular panel" type.

According to one aspect of the invention, there is provided an adjustable panel and mounting assembly comprising a panel and at least one mounting member adapted to adjustably support the panel in an installed position, the panel and the mounting member being provided with interengaging means which co-operate slideably, parallel to the plane of the panel, so as to allow adjustability of the panel position at least in a direction parallel to its plane; characterised in that the mounting member comprises a central body portion and a pair of outwardly extending, resilient or semi-rigid wings or arms, so that, in use, the central body portion is resiliently spaced away from the panel, and whereby the panel can move, under pressure, to compress the mounting member by flexing the wings.

Preferably, the panel is provided with facing projections and the wings or arms of the mounting member face apart and fit slideably between the panel projections. Preferably, the projections of the panel comprise flanges with inturned outer edges which face one another, so as to form a pair of mutually opposed facing slots to receive the mounting member, the spacing between the bottoms of the slots being greater than the distance between the co-operating ends of the mounting member. Thus when the panel is mounted on the mounting member, there is some "lost notion" between them which improves the initial adjustability and subsequent impact resistance of the assembly, without placing too much stress on the materials of the components.

Preferably the assembly also comprises a separate surface attachment device comprising a first portion adapted for attachment to a wall or similar surface by means of screws or the like, and a second portion, adapted to receive and retain said mounting member, and which is itself slidably retained in the said first portion.

Consequently, when the assembly is mounted with the slidable direction of the attachment device arranged at right angles to the direction of the flanges of the panel, it is possible to adjust the position of the panel in two directions at right angles to one another. This has particular advantages in a wall mounted heating system of the type including a number of cooperating sections, especially where the panels have to be aligned against surfaces or floors which are uneven.

In a preferred form of the invention, the attachment device incorporates a socket having a series of ribs on its inner walls, and the mounting member carries a projection having co-operating external ribs, the arrangement being such that the position of the mounting member, and thus the mounted panel, can also be adjusted inwardly and outwardly, relative to the attachment device, or at an angle to the vertical.

A preferred embodiment of the invention comprises a dismountable panel assembly including:

(1) A panel having a front surface and a rear surface carrying a pair of parallel, inwardly facing flanges;

(2) An intermediate mounting member including a pair of outwardly facing parallel flanges or beads adapted to fit between the flanges of said panel; and (3) A surface attachment device, incorporating a mounting adapted to receive said flanged mounting member;

the connection between said attachment device and said flange mounting member comprising cooperating male and female connector means.

The rear surface of the panel may carry tubes for heating or cooling fluids, and/or electrical heating elements and the mounting member may be provided with a further bore, to support and guide a conduit for electrical power cables.

These cables may be arranged to power an electrical heating element.

The invention also extends to an electrical heating panel incorporating an integral tubular member containing an electrical heating element, and which is preferably formed by extrusion. The panel may also be adapted to be mounted by means of a resilient or semi-rigid mounting as described above, with the power supply cable threaded through a conduit supported by the mounting member(s).

Means may also be provided for interconnecting two or more panels in a side-by-side relationship, or spaced apart with "infill" members between them, so that the system can be used to form a "suspended ceiling" effect, which is particularly useful in air conditioning systems in which it is required to pass cooling fluid through conduits incorporated in a ceiling. This arrangement also has the advantage that electrical power and data cables and other services can be mounted/concealed in the ceiling.

The present invention is particularly advantageous when applied to a heating system of the kind incorporating electrical heating elements. A number of such skirting heating systems are known, but the majority have specific drawbacks associated with the electrical and mechanical installation, in particular.

For example, because of the necessity for making suitable electrical connections to the individual sections of the skirting, it is usually necessary to provide modules of fixed lengths, so that extra "dummy" sections are usually required to complete a given run of skirting, from one end of the wall to the other. Consequently, the installation process tends to become somewhat labor intensive and the end result shows many joints which can be rather unsightly.

According to a further aspect of the invention, there is provided an electrically powered skirting heating module comprising an elongate panel incorporating an electrical heating element which extends along the length of the panel, with its opposite ends stopping short of the corresponding ends of the panel; and a pair of connection boxes, each of which is adapted to form an electrical termination for one end of the heating element, and which is adapted to cooperate with the panel so as to be mountable at a position between the end of the heating element, and the end of the panel, so that the skirting panel can be cut down to a suitable length, to facilitate proper fitting in position, whilst leaving a sufficient length to accommodate the connection box.

According to another aspect of the invention there is provided an electrically powered skirting heating module comprising an elongate panel incorporating a heating element and a co-operating mounting assembly including a resilient mounting member having one side which abuts against the rear surface of the panel, in use, and also including means for supporting a thermal cut-out device, the arrangement being such that the thermal cut-out device is held in contact with the rear surface of the panel by the resilience of the mounting member.

Preferably, the module is formed by extrusion, and the heating element is housed in a tubular formation on the rear surface of the extrusion, which is formed with an aperture, near each end of the module, to allow a connection to be made between the heating element and the connection box.

The connection box itself is preferably located in position by means of longitudinally extending flanges formed on the rear surface of the module, in which it is slidable, to a suitable position along the length of the module.

In the case of the electrical heating system, the mounting member preferably supports a conduit which has an open side facing the rear of the panel, which is adapted to receive a thermal cut-out device, the conduit also including one or more continuous channels for wiring, the arrangement being such that the thermal cut-out device is resiliently urged into engagement with the rear surface of the panel so as to detect any overheating, and is connected in the circuit so as to interrupt the supply through said wiring, if such overheating should occur.

According to a further aspect of the invention there is provided an electrically powered skirting heating system comprising a plurality of elongate modules, each of which comprises an outer elongate panel, an internal heating element and mounting assembly, and an internal electrical plug and socket connector system which is so arranged that adjacent modules can be plugged together with the interconnections concealed behind the outer panel. Preferably, the plug and socket system comprises a socket assembly mounted on the rear face of the panel near each end, and at least one pair of co-operating plugs which are pre-wired together by means of a fly lead so that the sockets of two adjacent modules can be quickly and easily connected.

Some embodiments of the invention will now be described by way of example, with reference to the accompanying drawings in which:

FIG. 1 is a cross section through a panel of a first type, in accordance with the invention;

FIG. 2 is a cross section through a panel assembly of a second type, showing how it is mounted on a wall;

FIG. 3 is a cross section through a first part of a mounting assembly forming part of the panel assembly of FIG. 2;

FIG. 4 is a vertical cross section through a second, cooperating part of the mounting assembly;

FIG. 5 is a front elevation of the component of FIG. 3;

FIG. 7b is an edge view of the attachment component of FIG. 7a;

FIG. 9 is an "exploded" perspective view of the mounting assembly components;

FIG. 10 is a partly broken away perspective view of an installed water-type skirting heating system;

FIG. 11(a) is an enlarged perspective view of an external corner component used in the system of FIG. 11;

FIG. 11(b) is an enlarged perspective view of an internal corner component;

FIGS. 11c and 11d are detail views of the corner components FIGS. 11a and 11b;

FIG. 12(a) is a diagrammatic view to illustrate a tube connector arrangement;

FIG. 12(b) is a perspective view of a connector component;

Figure 8:
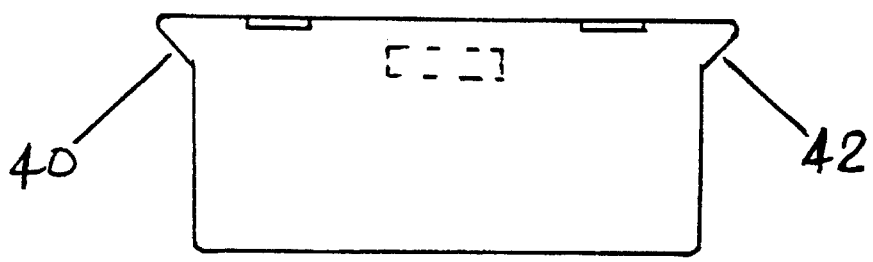
FIG. 8 is a cross section of the component of FIG. 6, taken on the line VIII—VII, with the component mounted in the attachment device of FIG. 7.
Figure 6:
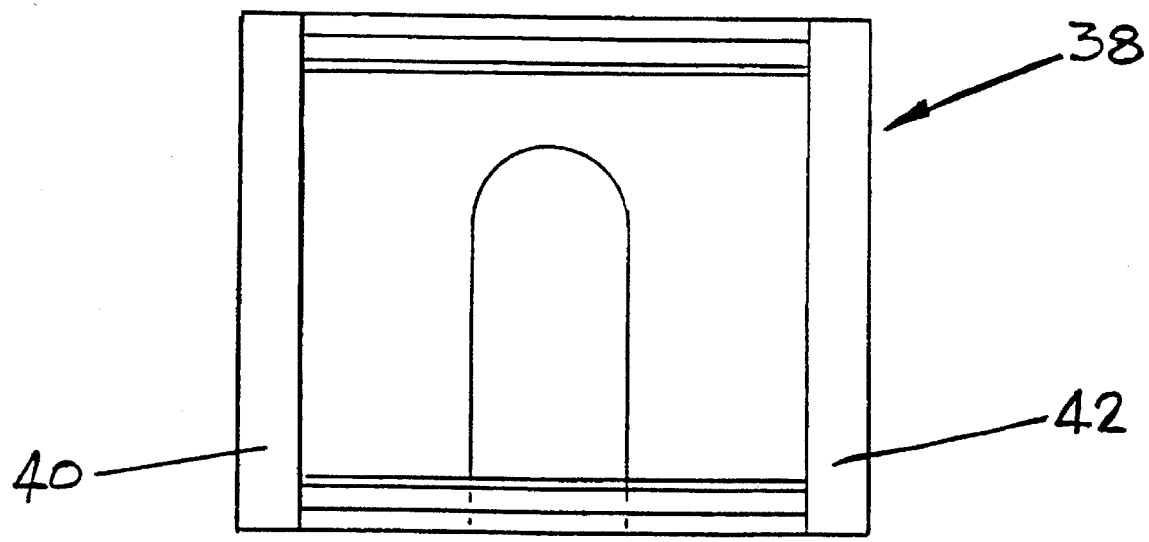
FIG. 6 is a front elevation of the component of FIG. 4.
Figure 7B:
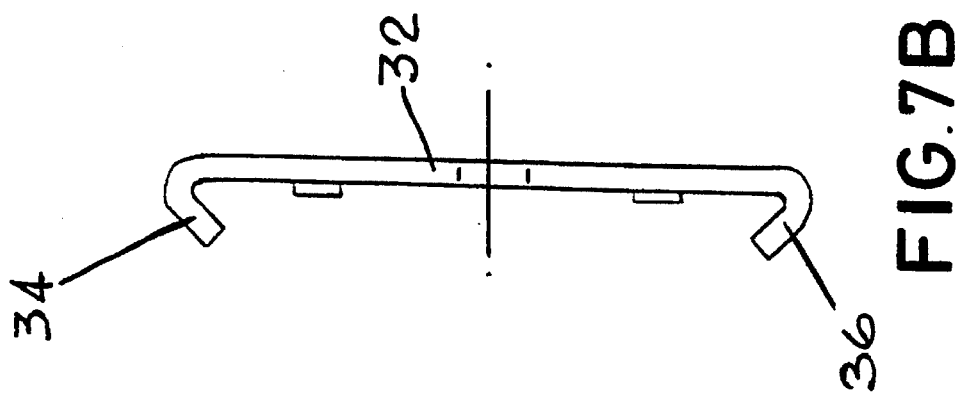
Figure 7A:
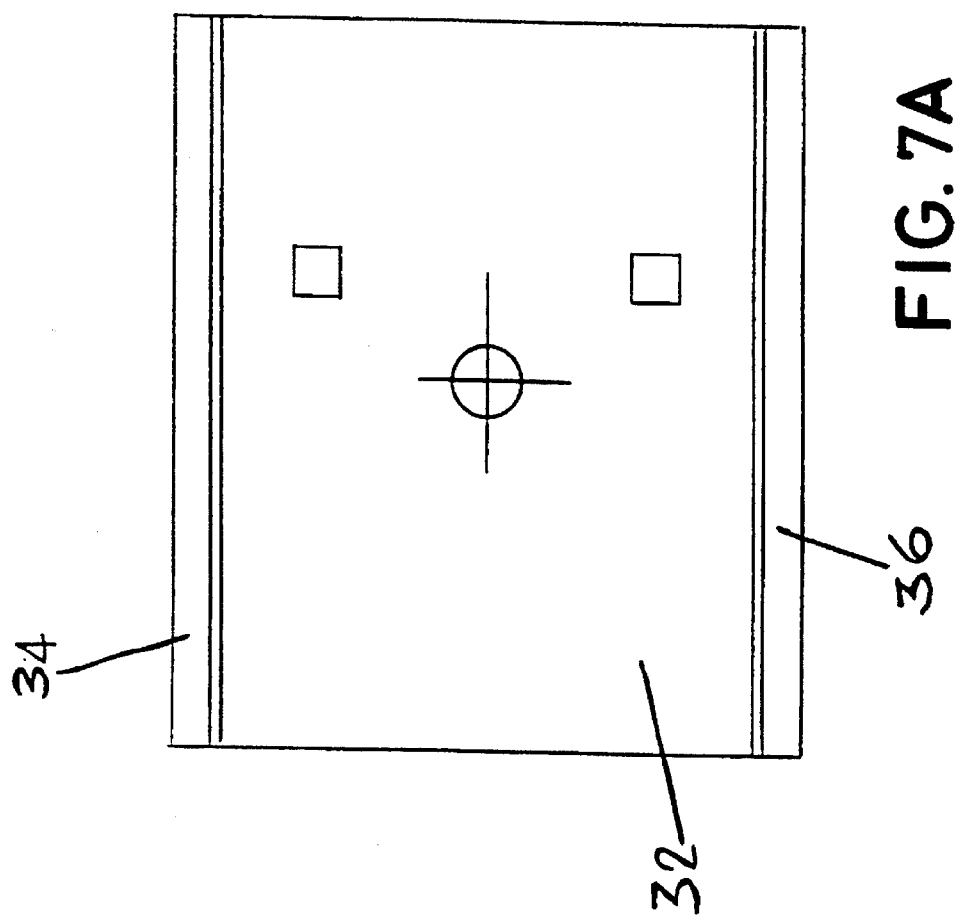
FIG. 7a is a front elevation of a wall attachment component.

Referring to the drawings, FIG. 1 shows a basic panel, which may, for example, be adapted to form part of a skirting panel radiator system, having a front surface 2, a flanged top portion 4 whose inner edge 6 abuts against a wall, in use, and whose rear surface 8 carries a pair of longitudinally extending, inwardly facing flange members 10 and 12 forming facing slots 11 and 13 respectively. As shown in FIG. 2, the rear surface of the panel incorporates members 14 and 16 which provide passageways to receive tubing for fluid, when the component is used as part of a skirting radiator system. The tubing is preferably copper tube which is expanded into place using hydraulic pressure. The use of copper ensures that connection can be made easily by known soldering techniques. In this embodiment, the flanges 10 and 12 are conveniently formed as projections on the members 14 and 16.

FIG. 2 also shows how the panel may be mounted against a wall. The mounting assembly comprises a mounting adapter or bracket 18 of a resilient plastics material such as nylon, having a pair of outwardly extending wings 20, as illustrated in FIG. 4 and also in perspective view in FIG. 9, whose outer edges 22, 24 are flat so as to engage in the slots 11 and 13 formed by the upper and lower flanges 10 and 12 of the panel. Owing to the resilience of the plastics material of the component 18, it can be "sprung" into the slots 11 and 13 formed by the flanges quite easily.

The rear part of the central portion of the adapter 18 comprises a projection 26 which extends parallel to the edges 22, 24, as shown more clearly in FIG. 4, and which has ribbed upper and lower surfaces 28, 30 so that the component can be "plugged into" a wall attachment device 32, 38. The central portion of the adapter 18 has a rectangular passage 27 passing through it as described in more detail below. As illustrated more clearly in FIG. 3 and FIGS. 6 to 9, the wall attachment device comprises a rectangular steel base plate 32 having opposed flanged edges 34, 36, and a mounting block 38 having outwardly projecting rear edge portions 40, 42 which cooperate slidably with the flanges 34 and 36 of the base plate 32.

The central portion of the mounting component 38 is formed with a ribbed channel 44 which receives the projection 26 of the mounting member 18, as shown in FIG. 2, and this recess has ribbed formations on its upper and lower surfaces corresponding to the formations 28 and 30 of the member 18, so that the depth to which the projection 26 enters the recess 44 is variable.

As will be appreciated from the exploded perspective view of FIG. 9, the mounting system is such that the position of the mounted panel is also adjustable both vertically and horizontally, in order to accommodate any irregularities in the surfaces against which, or adjacent to which, it is mounted. As can be seen from the Figures, the position of the mounting block 38 is vertically adjustable, by virtue of its sliding cooperation with the mounting plate 32, whilst the panel itself is slidable on the wings of the mounting adaptor 18, in a horizontal direction. Furthermore, "front-to-back"

variations can be allowed for, when the system is set up, in accordance with the depth to which the projection 26 of the mounting adapter is inserted into the socket 44 of the mounting block 38, and the adapter may in fact be "tilted" relative to the mounting block, if the wall is not vertical.

The system also has the considerable further advantage, compared to known panel mounting systems, that the flexibility of the "wings" 20 of the mounting adapter 18 and their degree of free movement in the mounting slots of the panel, are such that movements caused by thermal expansion of the mounted section or adjacent mounted sections, are automatically allowed for and the effect of accidental impact damage is minimised. In addition, since the panels can be slid vertically upwards by a small distance, even after the whole assembly has been installed, for example in a skirting heating system, it is possible to insert cables into the lower void, or for example, to insert the edges of floor coverings such as carpets beneath the edges. Similarly, the addition of any further conduit, data cables, connection boxes or the like is considerably facilitated.

FIG. 10 illustrates the application of the panel support system to a water type heating system of the "skirting" type. As shown in the figure, elongate skirting shaped panels 60 are mounted on supporting walls by means of a series of spaced apart mounting assemblies 62 comprising parts 18, 32, 40 as illustrated in FIG. 9. The panels incorporate tubular channels 64 for the flow and return of heating fluid, and are connected around corners by means of corner components of the kind illustrated in FIGS. 11a–11b. Owing to the flexibility of the mounting assembly 62, the problems caused by expansion and contraction of the heating panel are much reduced, as compared to a conventional type of mounting in which the brackets are all metal. In particular, because of the flexibility of the "wings" 20 of the mounting adapter, any longitudinal expansion of one of the sections 60 is automatically taken up by compression of the adapters of the adjacent section which is connected to it at right angles, i.e. the adjacent section is simply pushed slightly closer to the wall, with the wings 120 of its adapter(s) being slightly "flattened". Consequently it is not necessary to incorporate large and complicated corner jointing components. As illustrated in FIGS. 11a and 11b these are formed as relatively simple "box" structures of L-shaped cross-section, with open ends to cooperate with the ends of the skirting panels, as indicated at 66 and 68 in FIG. 10.

As illustrated in FIGS. 11A–11D, each corner unit comprises a pair of vertical walls 76 at right angles to one another, and an L-shaped top plate 78, with downwardly turned flanges 80 at the edges, which fit over the top edges of the corresponding ends of the starting panels. These top flanges are formed with inwardly facing beads 150, and similar inwardly facing beads 152 are formed along the lower edge, as shown in the enlarged views of FIGS. 11c and 11d so that the corner can simply clip over the ends of the panels. The internal surfaces of the corner pieces are smooth so that the ends of the panels can expand "telescopically" into them, as they heat up in use.

Referring to FIGS. 12A and 12B, in order to enable the skirting panel units to be cut exactly to any required length, without the necessity for leaving projecting portions of tube for making connections, special connector inserts 90 may be provided, which fit into the ends of the bores of the flow tubes, as illustrated in FIG. 12a. As shown in FIG. 12b, the insert comprises a short tube having an outer end 92 which is of the same diameter as the flow tube of the skirting panel (e.g. a standard 15 mm copper pipe) whilst the other end 94 is of reduced diameter so as to enable it to fit inside the end of the tube. Each end of the inserts also carries a "solder ring" to enable it to be easily fixed inside the tube, and so that a standard elbow fitting (for example) can then be attached to the projecting outer end 92 of the insert, as illustrated at 96 in FIG. 12a. As mentioned above, no special type of elbow fitting is required in the corners, because of the automatic absorption of expansion by the flexibility of the mounting adaptor.

Figure 13:
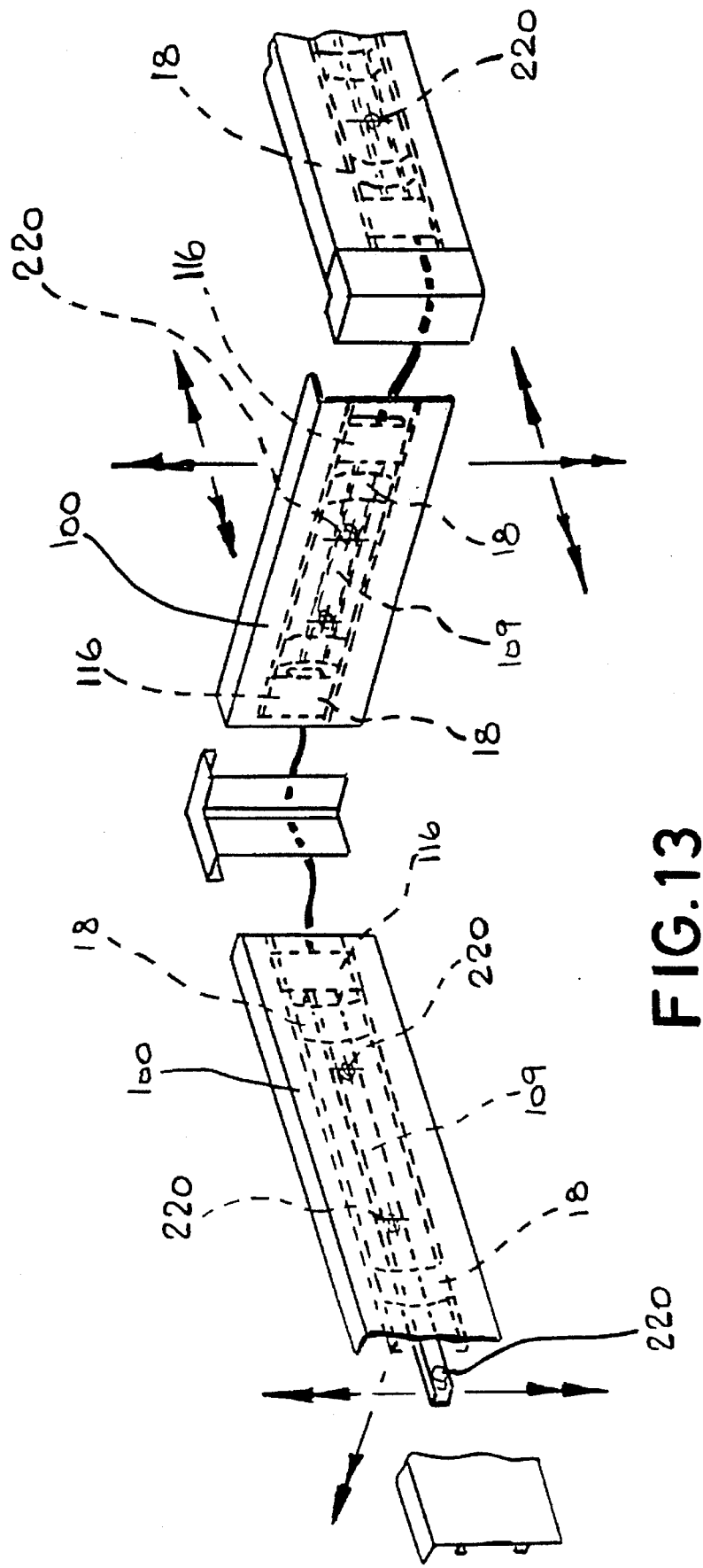
FIG. 13 is a partly broken away perspective view of an electrically powered type of skirting heating system.
Figure 14:
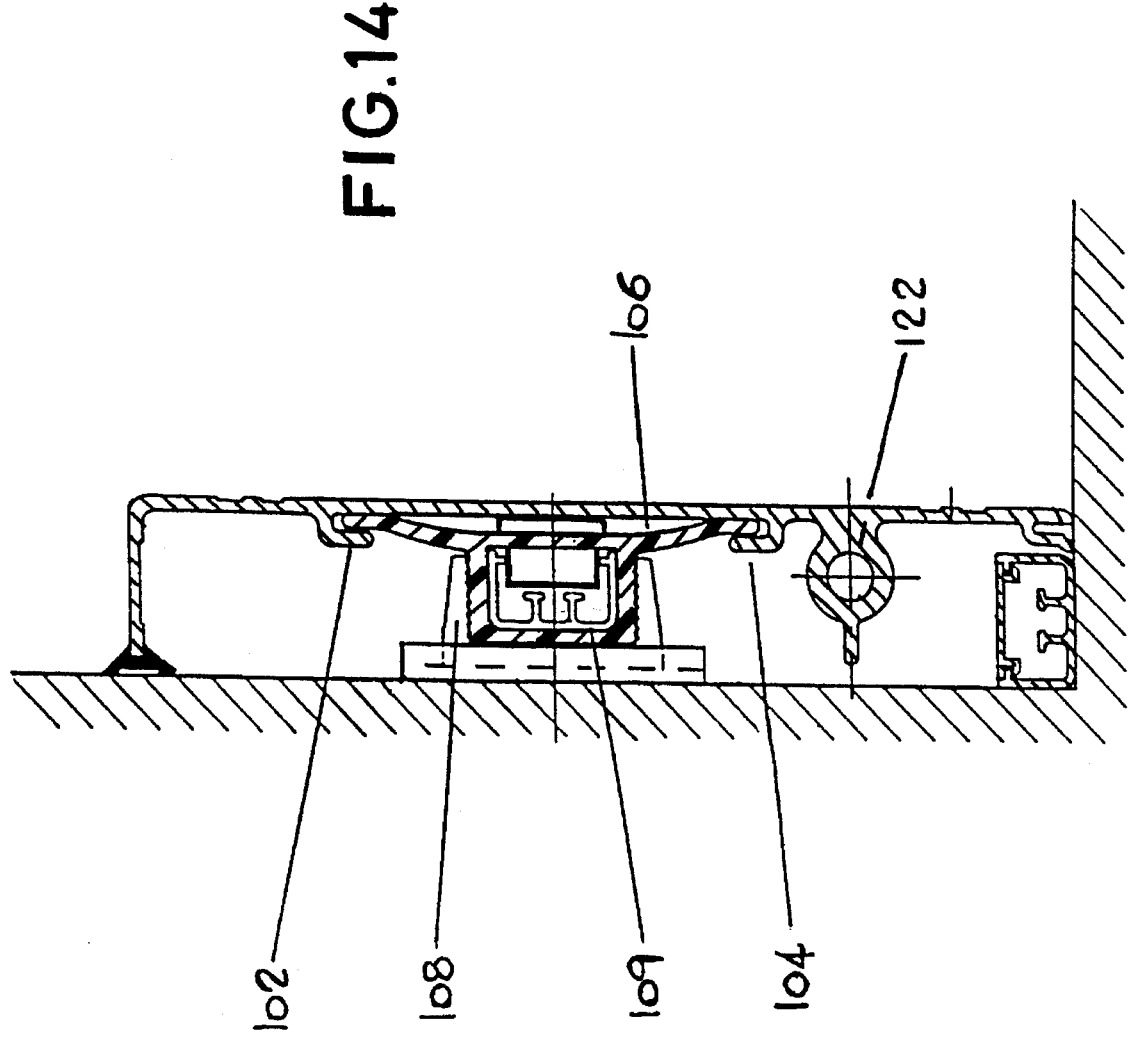
FIG. 14 is a vertical cross section through a part of the system of FIG. 13.
Figure 15:
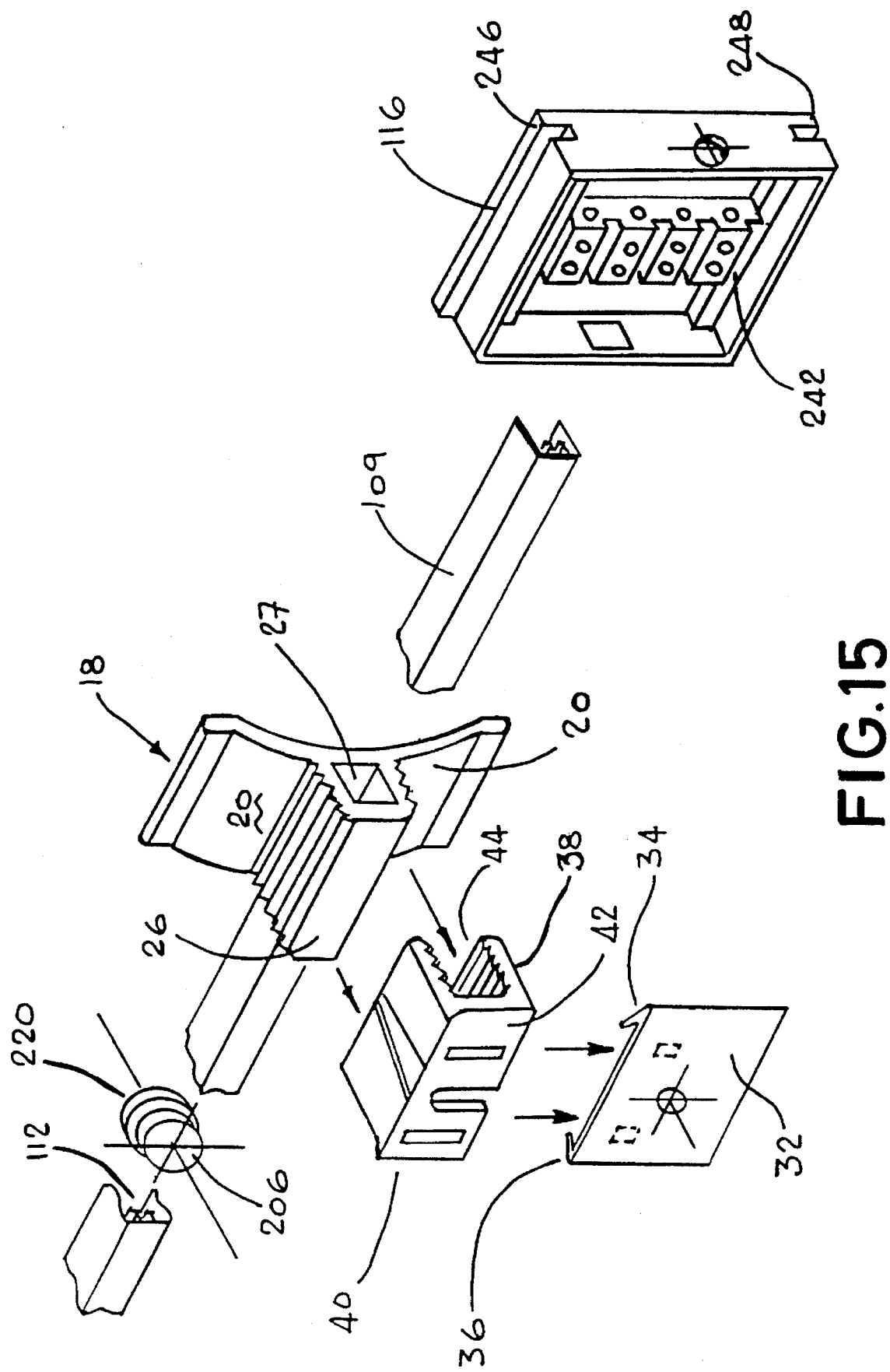
FIG. 15 is an exploded perspective view of the mounting assembly of the system of FIG. 13.
Figure 16:
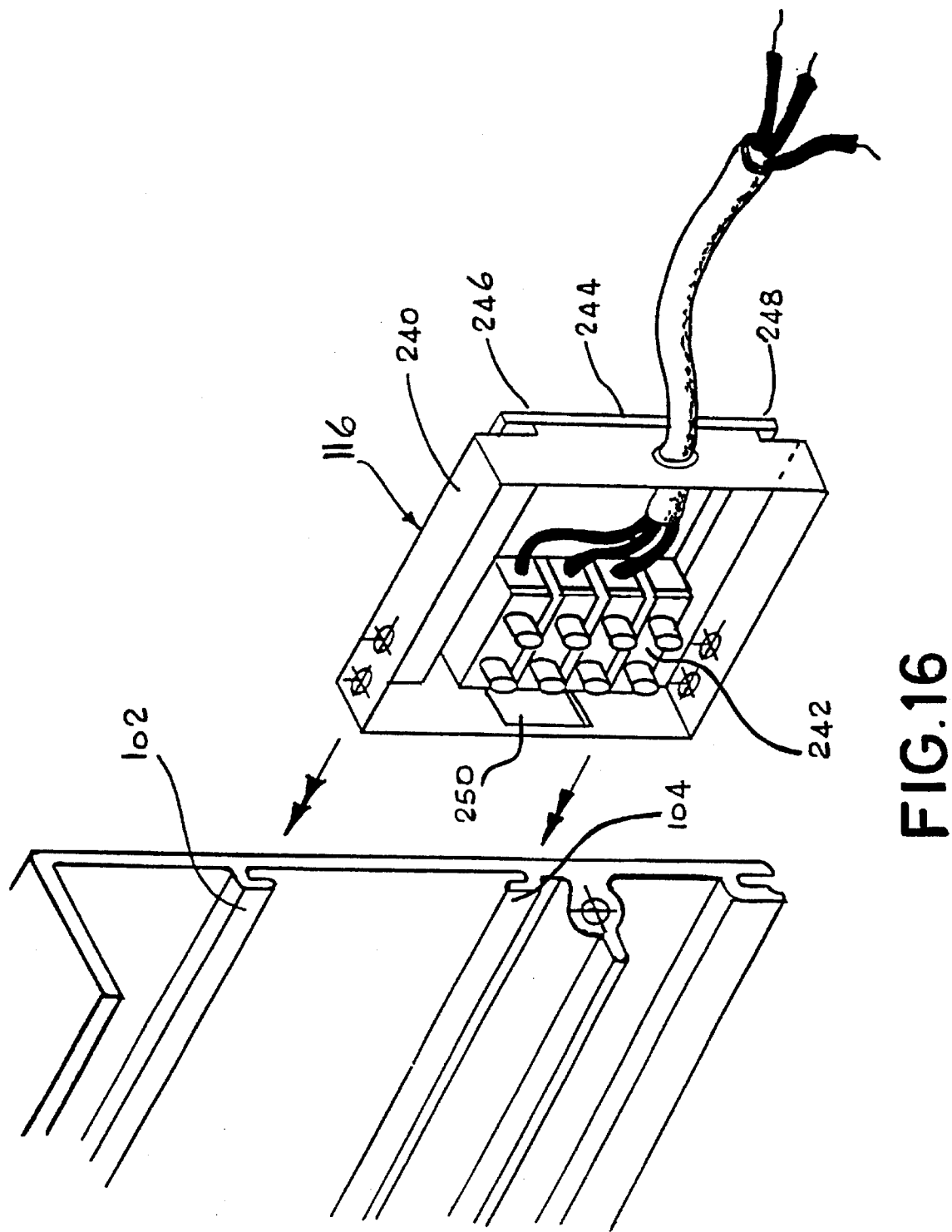
FIG. 16 is an enlarged cut-away view of a connecting box used in the system of FIG. 13.
Figure 17:
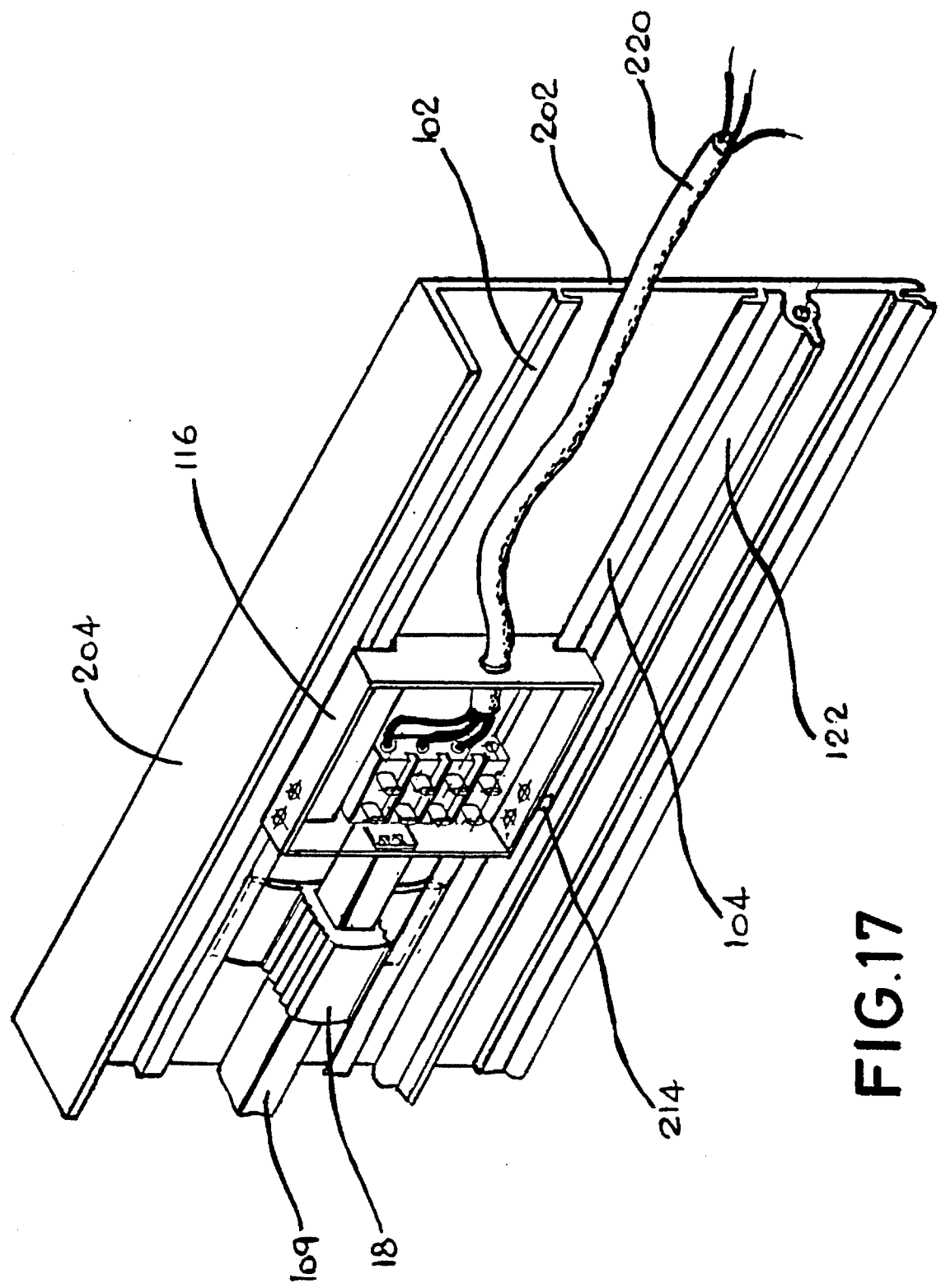
FIG. 17 is a rear perspective view of an electrically powered skirting heating panel in accordance with the invention.
Figure 18:
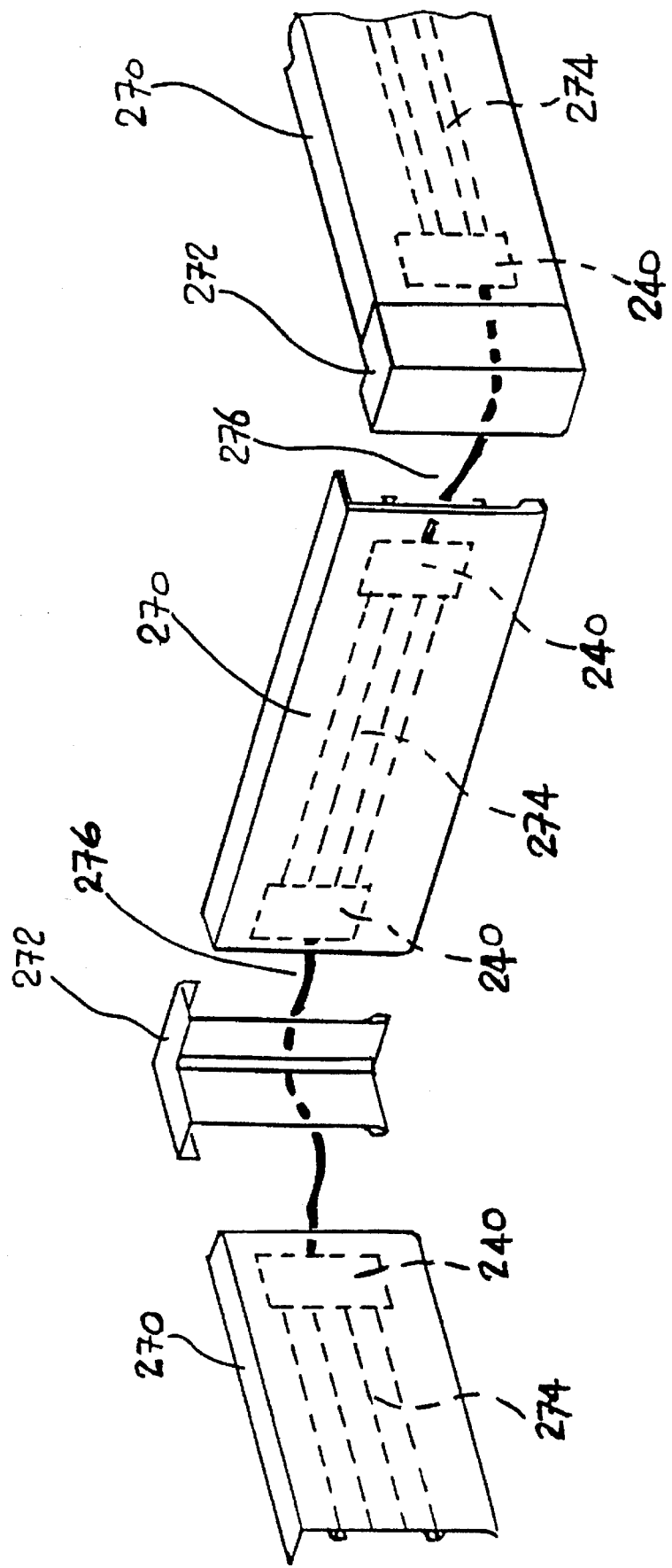
FIG. 18 is a rear perspective view of a connection box for use with the panel of FIG. 1.

FIG. 13 illustrates the installation of another embodiment of the invention which is designed to provide an electrical skirting heating system. The assembly comprises a series of elongate panels 100 which are provided with flanges 102, 104 (FIG. 14) on their rear surface for mounting by means of mounting adapters 18. As best illustrated in FIG. 15, an open fronted cable conduit 109 is threaded through the apertures 27 of the adapters so as to provide continuous internal channels 112 for electrical power cables. As illustrated in FIG. 13, the power cable 114 is thus supported throughout the length of the panel 100, and connections at the end of the panel may be made by means of a suitable connecting box 116, FIGS. 15 and 16. The connecting box 116 is formed with flanges 246, 248 at its top and bottom edges so that it can be slid into position between the flanges 102, 104 on the rear surface of the panel. A connecting terminal block 242 inside the box enables connections to be made to the heating element, and a "tail" 276 enables a connection to be made with the next adjacent section, as illustrated in FIG. 18. Alternatively, the outer side of the connecting box may include a socket to enable connectors to be made using pre-wired "fly-leads" with a plug on each end.

The electrical heating element comprises a long coil having one end connected to the L (live) terminal, of the connecting box at one end of the panel, and its other end 120 to the N (neutral) terminal at the other end of the panel. The coil is housed inside an integrally formed tubular bead 122 at the rear surface of the panel, which is preferably formed from a material such as extruded aluminium so as to have optimum heat transfer properties. The corners of the structure may be joined by hollow box-like members similar to those of FIG. 11, or by means of a clip-on or "Velcro" type attachment.

Once again, it will be appreciated that the mounting assembly allows of both vertical and horizontal adjustment of the position of the skirting panel, avoiding the necessity for accurate placement of the mounting plate 16 against the wall, whilst at the same time overcoming installation problems caused by uneven walls or floors.

It will thus be appreciated from a consideration of the arrangement shown in FIGS. 13 to 18 in particular, that the skirting panel can be fabricated in a series of "modular" lengths, in which the heating element itself extends along the majority of the length of the module, but terminates at the connection box, at a sufficient distance from the extreme end to allow the module to be simply cut down by a reasonable amount, in order to enable it to fit accurately on a particular site. The connecting box is then wired to the adjacent box in an adjoining module.

FIG. 13 also illustrates how a series of thermal cut-out devices 22a are positioned along the length of the modules, mounted in the open front of the cable conduit 109, so as to be held in contact with the rear surface of the panel FIGS. 2 and 9. In practice the thermal cut-out devices will be spaced at approximately 1 m intervals along the length of each module as indicated in FIG. 13. The resilience of the mounting assembly ensures that the thermal cut-out device is held in intimate contact with the rear surface of the skirting panel, so as to reliably sense the occurrence of any overheating. The supply cable extends from one thermal cut-out device to the next, so as to connect them in series and so that the supply can be interrupted by any one of them when activated, and the conduit also includes further channels for the other wiring of the electrical supply circuitry.

FIG. 18 also illustrates how a plurality of electrical skirting panels are connected together, so as to form a continuous installation around a number of walls in a room. Since the heating element does not extend to the extreme end of each pre-formed panel 270, each one can be cut to a suitable length, and connecting boxes 240 slid into its ends to allow necessary connections to the internal wiring 274 to be made. As will be clear from the drawing, the connecting boxes 40 may be supplied in pairs which are already connected to one another by means of 'tails' 276 which are sufficiently long to extend around an ordinary room corner.

It will also be appreciated that since the modules can be cut to variable lengths, the ends can also be joined more simply at the corners, for example by mitring them.

Figure 19:
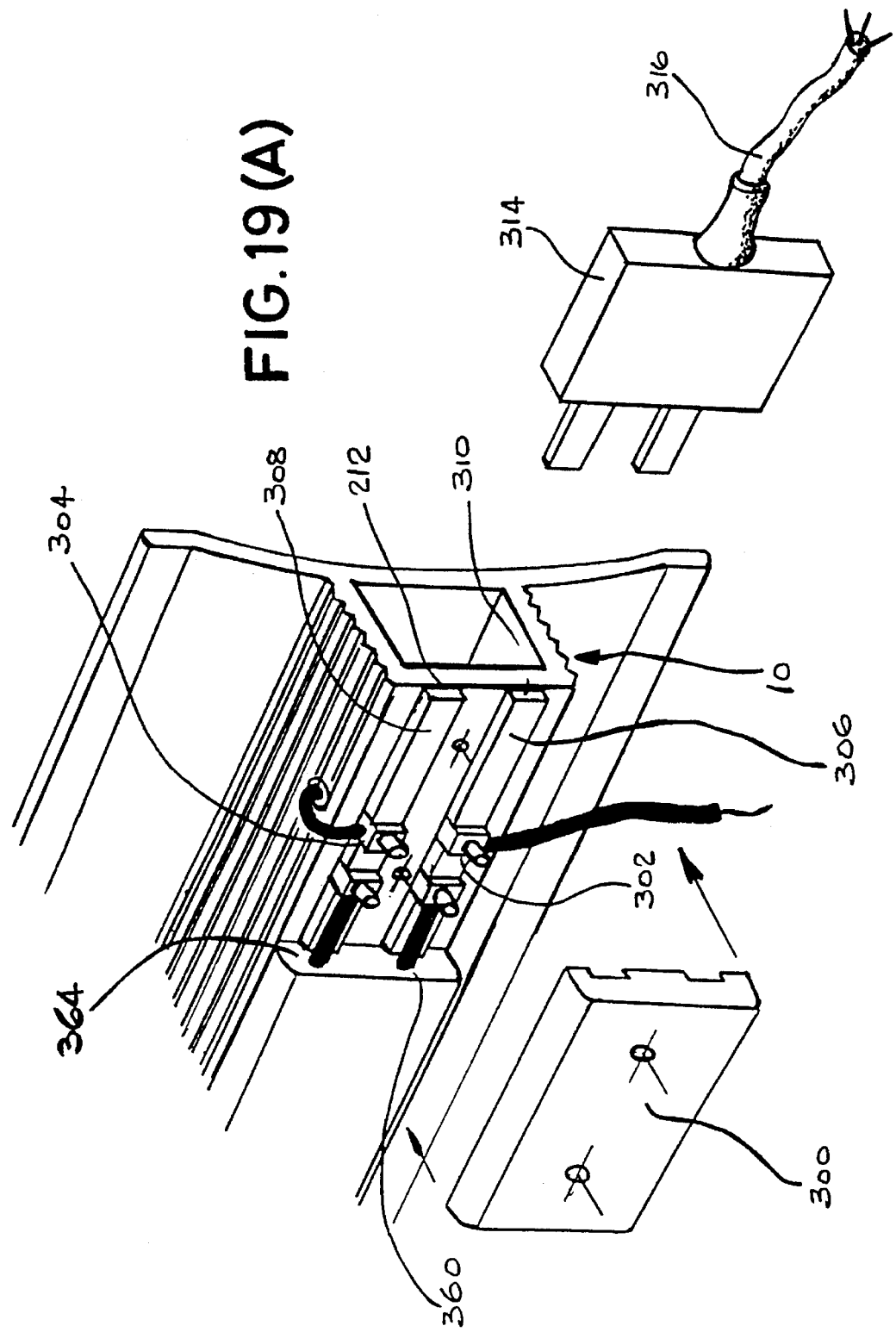
FIGS. 19a and 19b show an alternative connecting system.

Referring to FIG. 19, an alternative interconnection system is shown which utilises "plug and socket" connections. In this arrangement, the body of the mounting member (10) may be slightly enlarged as compared with the examples above so as to allow the attachment of a cover 300, which is removable to allow access to the ends of the wiring in channels 360 and 364. Terminal blocks 302 and 304 beneath the cover 300 are provided for making connections to the heating element and the thermal cut-out, and tubular sockets 306, 308 are formed respectively as extensions of the terminal blocks, so that their open ends (310, 312) coincide with the end of the mounting member.

A co-operating plug 314 with pins which fit the sockets 306, 308 has a fly lead 316 which is connected to a similar plug (not shown). This plug assembly can thus be used to connect the heating module to an adjacent socket, without the necessity for any "on-site" wiring.

Figure 20:
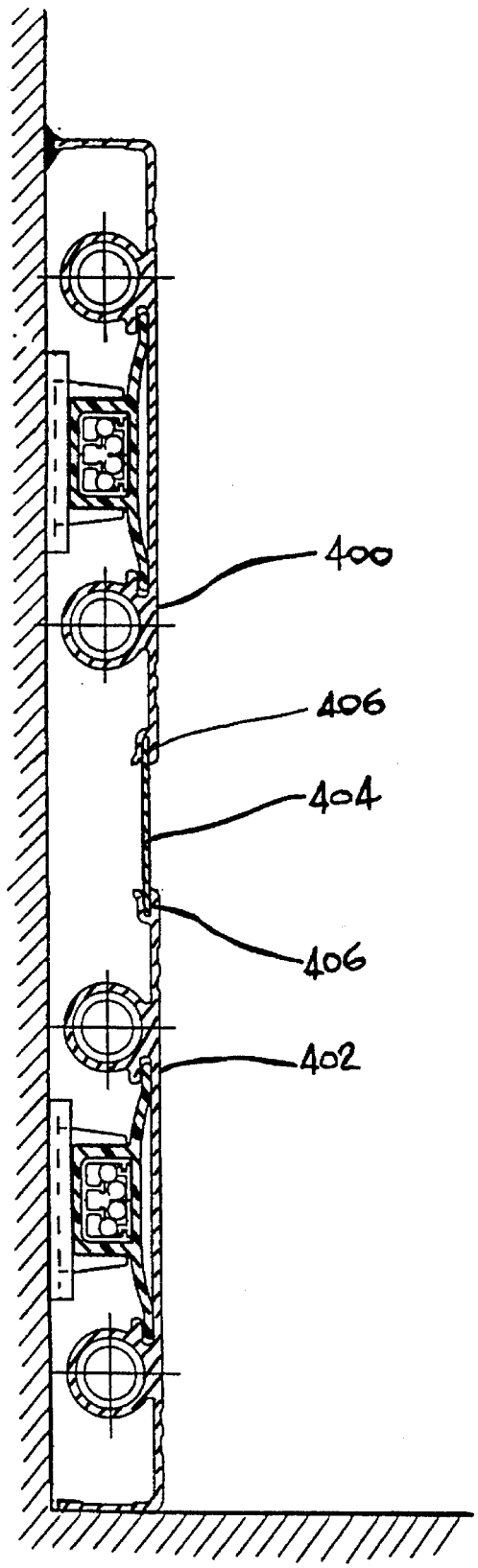
FIGS. 20, 21 and 22 illustrates various further panel arrangements.

FIG. 20 illustrates the use of the system in an installation where greater heat transfer capacity is required, and shows how two panels 400 and 402 can be mounted one above the other, or of course next to one another, interconnected by a strip 404 for example of aluminium. It will be appreciated that the heat transfer effect can be further increased by using a wider strip. The lower panel 402 is inverted, and each panel has a slot 406 formed along its (normally lower) edge so that the strip is located by the mutually opposed slots. The same kind of arrangement can be used to provide a closed "ceiling panel" assembly, particularly useful for cooling systems in air-conditioning installations.

Figure 21:
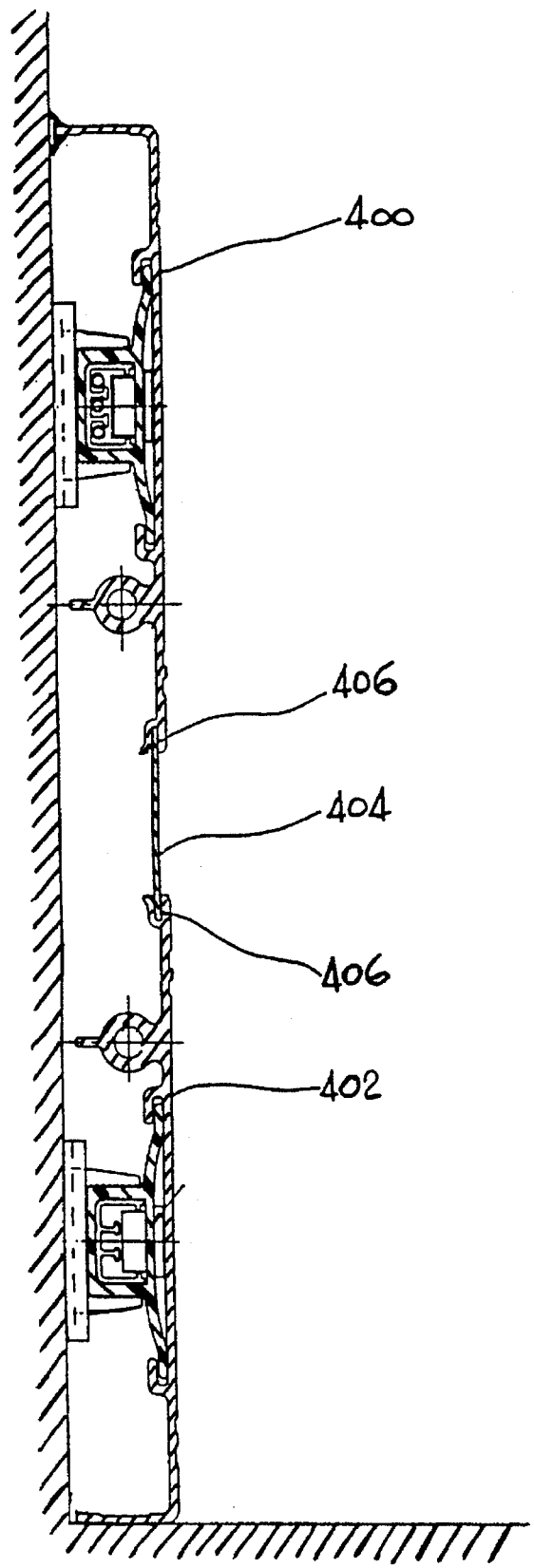

FIG. 21 illustrates a corresponding arrangement for an electrically heated system, in which the components have been numbered to correspond to those of FIG. 20.

Figure 22:
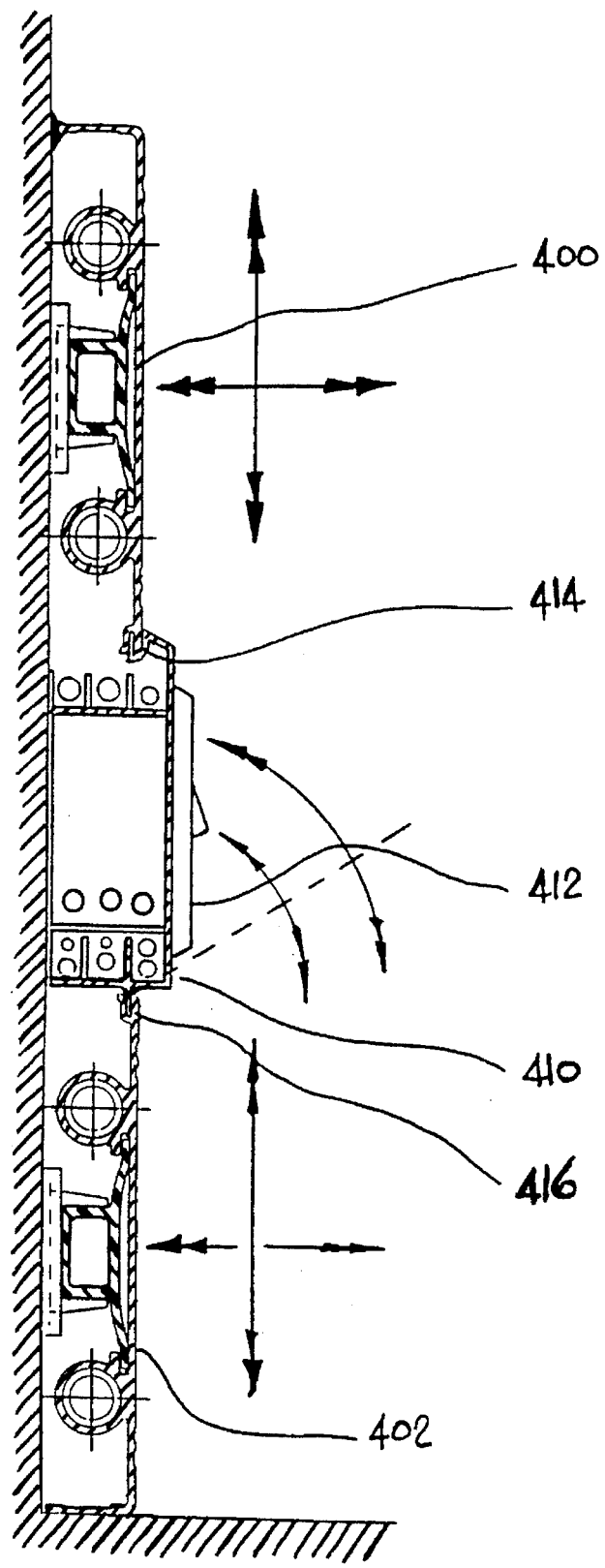

In addition to providing greater heat output, two adjacent panels (which may of course be either water or electrically-heated) can be used as illustrated in FIG. 22, to provide an integrated heating/service trunking system. As illustrated, the two panels 400, 402 are spaced apart sufficiently to accommodate a trunking module 410 which includes cable ducts, and mountings for switches 412, sockets and the like on its front surface. The upper edge 414 of the module is provided with a flange which fits into the slot 406 of the upper panel edge, while the lower edge is formed with a "hingeable" flange member 416 which fits into the slot 406 of the lower panel, so that access to the interior of the module can be obtained by sliding the top panel 400 upwardly to release the top edge of the module and then hinging the module downwards.

I claim:

1. An adjustable panel and mounting assembly, comprising:

a panel having a pair of rearwardly facing projections;

a mounting member adjustably supporting said panel in an installed position, said mounting member comprising a pair of projections which cooperate with said panel projections;

said panel projections and said mounting member projections being mutually slidable parallel to a plane of said panel in order to allow adjustability of the panel at least in said plane; and, wherein said mounting member projections comprise a resilient material and are in the form of outwardly divergent wings so that said panel is resiliently spaced away from said mounting member and can move, under pressure, toward said mounting member by a resilient flexure of said wings.

2. An adjustable panel and mounting assembly according to claim 1 in which the panel is provided with facing projections and the wings or arms of the mounting member face apart and fit slideably between the panel projections.

3. An adjustable panel and mounting assembly according to claim 1 in which the wings or arms of the mounting member are provided with facing projections and the panel is provided with co-operating means which face apart and fit slideably between the projections.

4. An adjustable panel and mounting assembly according to claim 2 in which the projections of the panel comprise flanges with inturned outer edges which face one another, so as to form a pair of mutually opposed facing slots to receive the mounting member, the spacing between the bottoms of the slots being greater than the distance between the co-operating ends of the mounting member.

5. An adjustable panel and mounting assembly according to claim 1 further comprising a surface attachment device comprising a first portion adapted for attachment to a wall, and a second portion adapted to receive and retain said mounting member, said second portion being mounted in the first member so as to be slidable parallel to the plane of the wall, whereby the first portion can be mounted on the wall in a suitable orientation to allow adjustment of the position of the second portion and thus the panel in a direction parallel to the panel flanges.

6. An adjustable panel and mounting assembly according to claim 5 in which the second portion of the attachment device and the mounting member cooperate by means of a plug and socket connection, the socket having a series of parallel ribs on its inner walls, and the plug having cooperating external ribs, whereby the position of the mounting member can be incrementally adjusted inwardly and outwardly, and at an angle relative to the attachment device.

7. An adjustable panel and mounting assembly according to claim 1 in which the mounting member is provided with a central conduit for the passage of electrical cables.

8. An adjustable panel and mounting assembly according to claim 7 further comprising an elongate insert adapted to clip in said aperture to form a sleeve for said cables, the insert being formed from a resilient plastic material and comprising parallel compartments with re-entrant front openings so that the cables can be clipped into position.

9. An adjustable panel and mounting assembly according to claim 1 further comprising an electrical heating system suitable for mounting as a room skirting, wherein the rear surface of the panel also carries an elongate element chamber for an electrical heating element.

10. An adjustable panel and mounting assembly according to claim 9 further comprising a thermal cut-out device which is mounted between the mounting member and the panel so as to be held in contact with the rear surface of the panel.

11. An adjustable panel and mounting assembly according to claim 1, further comprising an electrical heating system suitable for mounting as a room skirting, wherein the rear surface of the panel also carries an elongate chamber for an electrical heating element; and in which each panel is formed as an elongate module made in one of a range of pre-determined lengths, with the electrical heating element terminating short of at least one end of the module, whereby the module can be cut to an exact required length, in use.

12. An adjustable panel and mounting assembly according to claim 11 further comprising electrical connector means adapted to be mounted on the rear surface of the module adjacent each end, whereby the module may be electrically connected to an adjacent module.

13. An adjustable panel and mounting assembly according to claim 12 in which the connector means is provided with mounting flange means adapted to cooperate correspondingly with the flanges of the panel.

14. An adjustable panel and mounting assembly according to claim 1 comprising a fluid type heating system suitable for mounting as a room skirting, and wherein the rear surface of the panel carries flow and return tubes for heating fluid.

15. An adjustable panel and mounting assembly according to claim 14 further comprising tubular connectors which are adapted to fit into, and project from, the open ends of said flow and return tubes whereby adjacent modules may be cut to any required length and then connected directly together by means of said connectors, or connected together using intermediate lengths of standard sizes joints between connectors on adjacent modules.

16. An adjustable panel and mounting assembly according to claim 1 and further comprising corner joining pieces which are adapted to clip over the outer surfaces of the ends of adjacent panels.

17. An adjustable panel and mounting assembly according to claim 1 comprising an elongate panel having a locating means along one long edge for locating a strip like joining member, whereby the elongate edge can be joined to the corresponding edge of another panel, so that two panels can be mounted adjacent to one another, in either a vertical or horizontal plane.

18. An adjustable panel and mounting assembly according to claim 17, further comprising a trunking assembly adapted to fit between said edge slots or flanges of two adjacent panels.

19. An adjustable panel and mounting assembly according to claim 17, further comprising a trunking assembly adapted to fit between said edge slots or flanges of two adjacent panels; and in which the trunking assembly is provided with a fixed flange along one side to cooperate with the corresponding slot or flange of a first adjacent panel, and a hingeable flange along the other side, to cooperate with the other panel, whereby access to the interior of the trunking can be obtained by sliding said first panel outwardly on its mounting member or members to release the fixed flange, and then hinging the trunking outwardly about its other edge.

20. An adjustable panel and mounting assembly according to claim 1 and comprising a panel assembly which is adapted to be mounted on a vertical or horizontal surface, and which incorporates both heating means and service trunking for cables, and movable means for access to the interior of said trunking.

21. An adjustable panel and mounting assembly according to claim 20 comprising a pair of parallel heating panel assemblies, the trunking being mounted between them, and the access means comprising a hingeable front mounting member incorporated in said trunking.

22. An electrical skirting heating system comprising an elongate module made in one of a range of predetermined lengths and carrying an elongate heating element which terminates short of at least one end of the module, whereby a continuous range of lengths of module can be obtained by cutting down one of said predetermined lengths, said module comprising:

a panel comprising a pair of rearwardly facing projections;

a mounting member comprising a pair of projections which cooperate with said panel projections;

said panel projections and said mounting member projections being mutually slidable, parallel to a plane of said panel, so as to allow adjustability of the panel at least in said plane; and, said mounting member projections comprising outwardly divergent, resilient wings, whereby said panel is resiliently spaced away from said mounting member and can move, under pressure, towards said mounting member by resiliently flexing said wings.

23. A heating system according to claim 22 further comprising electrical connector means adapted to be mounted on the rear surface of the module adjacent each end, whereby the module may be electrically connected to an adjacent module.

24. A heating system according to claim 23 in which the connector means is provided with mounting flange means adapted to cooperate correspondingly with the flanges of the panel.

* * * * *